US012790177B2

(12) United States Patent
Haag et al.

(10) Patent No.: US 12,790,177 B2
(45) Date of Patent: Nov. 10, 2026

(54) ESCALATOR APPARATUS HAVING A HEIGHT-LIMITING DEVICE ACTING ON STEP ROLLERS, AND USE

(71) Applicant: TK ELEVATOR INNOVATION AND OPERATIONS GMBH, Düsseldorf (DE)

(72) Inventors: Martin Haag, Hamburg (DE); Reiner Ludwig, Stockheim (DE)

(73) Assignee: TK ELEVATOR INNOVATION AND OPERATIONS GMBH, Düsseldorf (DE)

( * ) Notice: Subject to any disclaimer, the term of this patent is extended or adjusted under 35 U.S.C. 154(b) by 129 days.

(21) Appl. No.: 18/846,867

(22) PCT Filed: Mar. 16, 2023

(86) PCT No.: PCT/EP2023/056800
§ 371 (c)(1),
(2) Date: Sep. 13, 2024

(87) PCT Pub. No.: WO2023/175101
PCT Pub. Date: Sep. 21, 2023

(65) Prior Publication Data
US 2026/0257893 A1 Sep. 3, 2026

(30) Foreign Application Priority Data
Mar. 17, 2022 (CN) ......................... 202210265338.4

(51) Int. Cl.
*B66B 21/04* (2006.01)
*B65G 23/12* (2006.01)
(Continued)

(52) U.S. Cl.
CPC .............. *B66B 21/04* (2013.01); *B65G 23/12* (2013.01); *B66B 23/145* (2013.01); *B66B 29/00* (2013.01); *B66B 23/02* (2013.01)

(58) Field of Classification Search
CPC ....... B66B 21/04; B66B 23/14; B66B 23/145; B66B 23/12; B66B 23/02
See application file for complete search history.

(56) References Cited

U.S. PATENT DOCUMENTS 2,023,067 A * 12/1935 Dunlop .................. B66B 23/14 198/329
2,231,709 A * 2/1941 Dunlop ................ B66B 23/145 198/332
(Continued)

FOREIGN PATENT DOCUMENTS

CN 204310670 U 5/2015
CN 106744226 A 5/2017
(Continued)

*Primary Examiner* — Mark A Deuble
(74) *Attorney, Agent, or Firm* — Dinsmore & Shohl LLP

(57) ABSTRACT

The present disclosure relates to an escalator device with at least one motor-driven escalator, which has a plurality of individual stair step units mounted so as to be movable relative to one another, wherein the stair step units can be displaced together by motor along a displacement path, wherein each stair step unit has at least one step roller, wherein the respective step roller is mounted about a step roller axis and is guided over a rail or similar support structure, wherein the escalator device has a height limiting device. Furthermore, the present disclosure invention relates to the use of a height limiting device in such an escalator device.

10 Claims, 2 Drawing Sheets

(51) Int. Cl.

| | |
|---|---|
| ***B66B 23/14*** | (2006.01) |
| ***B66B 29/00*** | (2006.01) |
| *B66B 23/02* | (2006.01) |

(56) References Cited

U.S. PATENT DOCUMENTS

| | | | | | |
|---|---|---|---|---|---|
| 3,834,513 | A * | 9/1974 | Miura | B66B 23/145 198/332 |
| 5,161,668 | A * | 11/1992 | Datema | B66B 23/12 198/332 |
| 9,802,791 | B2 * | 10/2017 | Ludwig | B66B 23/12 |
| 2025/0207631 | A1 * | 6/2025 | Thele | F16C 23/06 |

FOREIGN PATENT DOCUMENTS

| | | | | | |
|---|---|---|---|---|---|
| CN | 111332927 | A | * | 6/2020 | B66B 23/12 |
| CN | 111410112 | A | * | 7/2020 | B66B 23/14 |

* cited by examiner

ESCALATOR APPARATUS HAVING A HEIGHT-LIMITING DEVICE ACTING ON STEP ROLLERS, AND USE

CROSS REFERENCE TO RELATED APPLICATIONS

The present application is the National Phase entry of International Patent Application PCT/EP2023/056800, filed Mar. 16, 2023, which in turn claims priority benefit to Chinese Patent Application 202210265338.4, filed Mar. 17, 2022, the entire contents of both which are hereby incorporated by reference into this application.

TECHNICAL FIELD

The present disclosure relates to an escalator which has a plurality of individual stair step units which are mounted so as to be movable relative to one another, wherein the stair step units can be displaced together by motor along a displacement path, wherein each stair step unit has at least one step roller, wherein the respective step roller is mounted about a step roller axis and is guided over a rail or similar support structure.

BACKGROUND

Many of the escalators currently in operation carry the risk that individual steps could shift in height, i.e. lift themselves or be lifted by third parties. However, particularly in an area in which users or passengers walk over the steps, only a single exact predefined height position of the respective step should be predefined/predefinable in the respective operating state. To date, no particularly effective and particularly simple measures for preventing such an unwanted upward or tipping movement of the individual steps have been known. Although there are already escalator products on the market in which a height movement is to be prevented by limiting an upward shift on the step itself, such as by hooks or the like cast onto a base body of the step, this solution is not considered to be optimal, for example with regard to the manufacturing effort.

SUMMARY

Based on this situation, it is an object of the present disclosure to provide a device in which an upward or tilting movement of a respective step of escalators can be prevented in an effective and simple manner, while being as cost-effective as possible and while the measures envisaged/envisageable for this purpose can be implemented in a way that is as advantageous as possible in terms of construction.

The object of the present disclosure is achieved by the features of the independent main claim and the subordinate use claim. Advantageous embodiments are specified in the subclaims. If technically possible, the teachings of the subclaims can be combined as desired with the teachings of the main and subclaims.

The object is therefore achieved by an escalator device with at least one motor-driven/driven escalator, which has a plurality of individual stair step units that are mounted so as to be movable relative to one another, wherein the stair step units can be displaced together by motor along a displacement path, such as along a circumferential displacement path with forward and reverse travel, wherein each stair step unit has at least one step roller, for example at least one step roller laterally on each side of the respective stair step unit, wherein the respective step roller is mounted around a step roller axis and is guided over a rail or similar support structure of the escalator, wherein the escalator device has a height limiting device which defines a height limiting stop to prevent an upward vertical movement of the respective stair step unit, wherein the height limiting device interacts with the respective step roller axis, wherein the height limiting device is arranged relative to the step roller axes in such a way that the step roller axes are guided past the height limiting device without contact when the respective stair step unit is arranged as intended and only in the event of an (undesirable, avoidable) upward vertical movement of the step roller axis, they come into contact with the height limiting device. This not only promotes a stable arrangement with a comparatively slim overall construction, but also enables material savings.

It has been shown that the measure according to the present disclosure can be advantageously implemented in particular in the entire area of the escalator used by users/passengers, in particular along the entire travel route.

In other words, it is provided that the respective step roller axis is implemented as a force transmission for counteracting an undesirable upward movement in height, in particular by the respective step roller axis projecting laterally beyond the respective step roller (unit).

It has also been shown that material savings can be achieved, such that no hooks have to be cast or screwed onto the stair step units. Furthermore, structural or strength-related advantages can also be achieved, in particular in that the rigidity of existing components such as a step roller guide rail(s) can be used.

Advantageous aspects of the present disclosure are explained below and embodiments of the present disclosure are described further below. Explanations, in particular regarding advantages and definitions of features, are basically descriptive and preferred, but not limiting examples. If an explanation is limiting, this is expressly mentioned.

According to one embodiment, the respective step roller axis extends in such a way that the respective step roller axis projects beyond the corresponding step roller with a protruding axis section, i.e. projects from the corresponding step roller or other components provided for its mounting, wherein the height limiting device extends at least partially between a/the stair step of the stair step unit, in particular a stair step base body, and the step roller axis and thereby defines the height limiting stop in relation to the step roller axis. This arrangement also provides advantages in terms of construction, and/or with regard to simple implementation of the height limiting measure.

According to one embodiment, the respective step roller axis extends inwards, i.e. towards a central area of the respective stair step units, in such a way that the respective step roller axis projects inwards beyond the corresponding step roller and protrudes inwards from the corresponding step roller or other components intended for its mounting, wherein the height limiting device extends at least partially between a/the stair step of the stair step unit and the step roller axis and thereby defines the height limit stop. This arrangement also enables particularly slim integration in a simple manner, for example also in existing systems.

According to one embodiment, the height limiting device has a section that encompasses a/the free (such as an inner) end of the respective step roller axis, a section that is L-shaped in cross section and encompasses the respective step roller axis, with the encompassing section in a contactless arrangement relative to the respective step roller axis (if the respective stair unit is arranged as intended). Last but not least, this also enables location/position variations or adjustments for specific arrangements in a particularly simple and cost-effective manner.

According to one embodiment, the height limiting device extends continuously along the displacement path at least in the area of a/the advance of the displacement path, such that the height limiting device provides a guide rail section at least along the advance of the displacement path, a guide rail section with an L-shaped cross section in an overlapping arrangement above the respective step roller axis. This also enables implementation of the height limit for any relative position along the displacement path. The height limiting device can be designed at least partially or in sections as an (additional) guide rail (or individual guide rail elements arranged in a row), which is mounted or arranged contactlessly relative to the step rollers and stair unit when used as intended (i.e. without vertical movement). This also favors application-specific implementation without significant additional effort.

According to one embodiment, the height limiting device is connected at a point or at least in sections also over a surface to a rail for the step rollers, or to a support structure on which at least one (guide) rail for the step rollers is arranged. This also provides design advantages, in particular with regard to the use of the available installation space. This type of fastening also enables a comparatively slim, simple implementation with numerous different design variants.

According to one embodiment, the height limiting device is arranged relative to the step roller axes (or the step roller axes are arranged and/or aligned in such a way) that the step roller axes come into contact with the height limiting device from a predefinable threshold value of 2 mm or 3 mm or 4 mm of the upward vertical movement. The maximum permissible or maximum tolerated displacement tolerance in the height direction can also be specifically predefined, for example also depending on a longitudinal position on the displacement path.

According to one embodiment, the respective step roller axis is provided by a screw, such as the screw that fixes the corresponding step roller. This enables a particularly simple implementation, whereby the forces arising from vertical runout or mechanical contact can also be advantageously introduced/passed on.

According to one embodiment, the respective stair step unit has at least one first step roller and at least one second step roller, such as laterally on each side of the respective stair step unit, the first step roller being arranged in a front (front-side in the direction of displacement) area of the stair step unit, the second step roller being arranged in a rear (rear-side in the direction of displacement) area of the stair step unit, the height limiting device being arranged in such a way that a/the height limiting stop is provided for an upward vertical movement of at least the step roller axis of the second (rear-side) step roller. The implementation at least on the rear-side step roller provides a good effect with minimized technical effort in such escalators. Optionally, a height limit can also be provided on the respective front-side step roller.

The aforementioned object is also achieved by using a height limiting device in an escalator device for limiting a vertical movement of a respective stair step unit of the escalator device, such as in an escalator device previously described above, wherein the height limiting device defines a height limiting stop to prevent an upward vertical movement of at least one step roller of the respective stair step unit, for the purpose of limiting any (undesirable, improper) vertical movement of the corresponding step roller to a maximum of 1 mm to 4 mm, in that an encompassing section is provided by the height limiting device, which encompasses a/the free end of a/the step roller axis of the respective step roller, an encompassing section with an L-shaped cross-section, in particular with an L-profile rotated by 180° compared to an L-letter and standing upside down. This provides, among other things, the advantages described above.

BRIEF DESCRIPTION OF THE DRAWINGS

The present disclosure is explained in more detail below with reference to the attached drawings using preferred embodiments. The wording figure is abbreviated to Fig. in the drawings. In the drawings.

DETAILED DESCRIPTION

Figure 1:
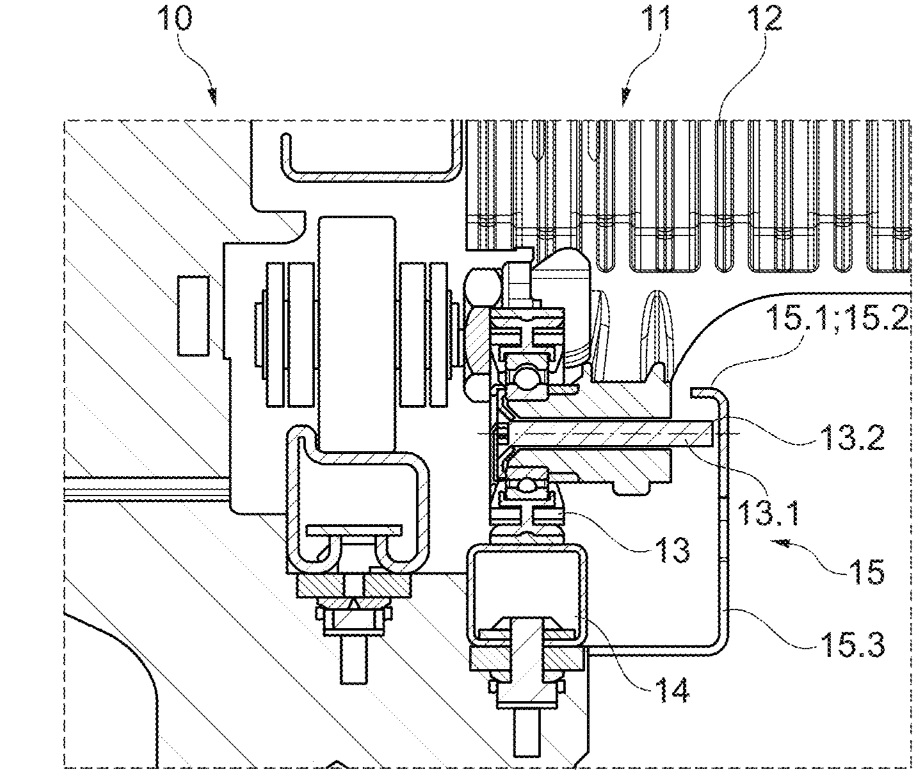
FIG. 1 is a schematic sectional side view of the arrangement according to a preferred embodiment of the present disclosure.

The embodiments described are merely examples that can be modified and/or supplemented in many ways within the scope of the claims. Each feature described for a specific embodiment can be used independently or in combination with other features in any other embodiment. Each feature described for an embodiment of a specific claim category can also be used in a corresponding manner in an embodiment of another claim category.

First, the present disclosure is described with general reference to all reference symbols.

An escalator device 10 includes at least one escalator 11 with a plurality of stair step units 12, which are each guided and supported on step rollers or step roller units 13, in particular laterally on both sides, for example with two step rollers (units) on each side of a respective stair step unit. The step rollers (units) 13 are guided via a rail or similar support structure (guide rail) 14, in particular laterally on both sides on one or two rails.

The present disclosure is based on the concept of laterally extending an axis X13 of the respective step roller (unit), in an arrangement laterally protruding from the step roller, so that a protruding axis section 13.1 is formed on the respective step roller, which has a free end 13.2.

The present disclosure is further based on the finding that a height limiting device 15 with a height limiting stop 15.1 can be advantageously implemented by having an encompassing section 15.2 guided around the free end 13.2 of the respective step roller axis X13. For this purpose, a guide rail section 15.3 with a comparatively large longitudinal extension (in the direction of displacement) can optionally be provided, and individual brackets can also be provided optionally.

A height difference $\Delta z$ is provided between the height limit stop 15.1 defined by the encompassing section 15.2 and the free end 13.2, namely between the intended height position of the step roller (axis) and the stop 15.1, whereby the height difference $\Delta z$ can be a few millimeters, for example 1 mm to 3 mm, depending on the design of the escalator and/or depending on the desired movement tolerance in the height direction.

Figure 2:
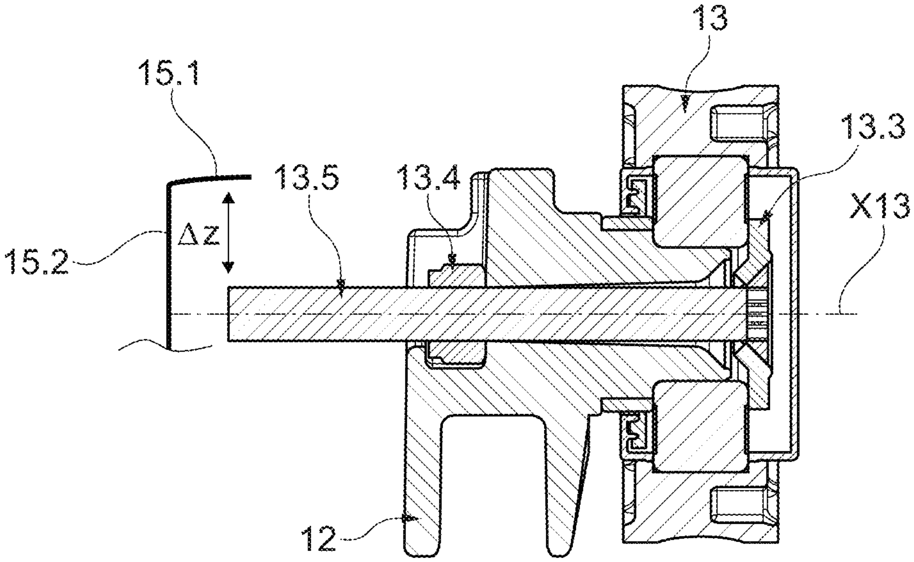
FIG. 2 is a detailed view of the arrangement according to a preferred embodiment of the present disclosure.

The respective protruding extended step roller axis X13 can be realized, for example, by using the following components with the structure of the respective step roller (unit) otherwise remaining largely unchanged: disc 13.3, nut 13.4, screw 13.5 (FIG. 2). With such a structure, it has been shown that an extended screw 13.5 can advantageously fulfill the function of a protruding extended step roller axis X13.

The escalator device can further include the components known from the prior art for driving and controlling the displacement in the direction of travel, such as a motor, a control unit, actuators, sensors, and the like (not explicitly described in the figures).

FIG. 1 shows an extended step roller axle X13 with protruding section 13.1 and free end 13.2. The protruding section 13.1 is encompassed by the encompassing section 15.2 of a height limit stop, so that a stop is provided in the direction of upward movement.

In FIG. 1, a further step roller is also visible, which is arranged laterally offset and offset in the direction of travel to the step roller 13 described here (such as in a front, bow-side area of the stair unit).

FIG. 2 shows an axis X13 provided by a screw 13.5. The screw can be secured with a nut 13.4, and a disk 13.3 can be provided to optimize the force transmission. The axis X13 or the screw 13.5 sits in a base body of the respective step roller unit 13, on which a (ball/roller) bearing of the step roller can also be supported.

FIG. 2 further schematically illustrates that the (undesirable) height movement of the step roller can be given a tolerance range by providing a height difference Δz between the axis X13 and the stop 15.1, depending on the area of application.

The view shown in FIG. 2 is reversed to the view shown in FIG. 1. In other words: the implementation according to the present disclosure can be provided on both sides of a respective stair unit.

Figure 3:
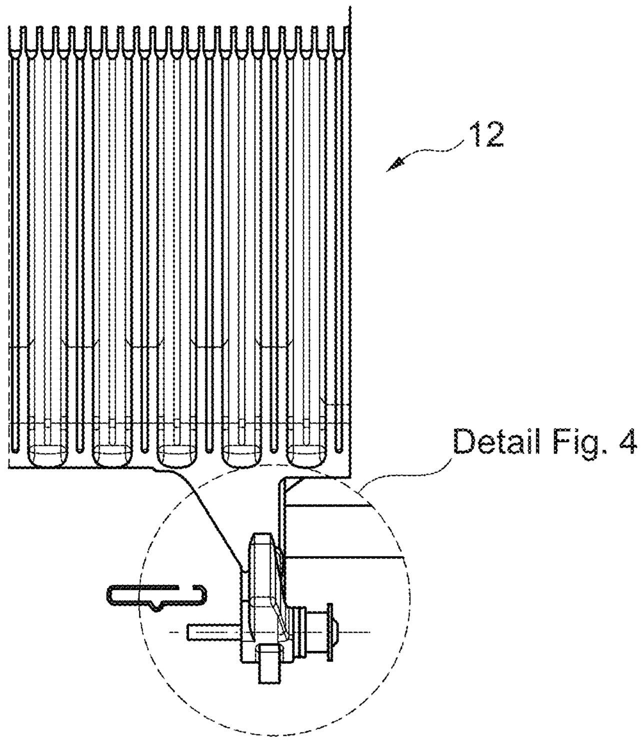
FIG. 3 is a further schematic side view of the arrangement according to a preferred embodiment of the present disclosure.
Figure 4:
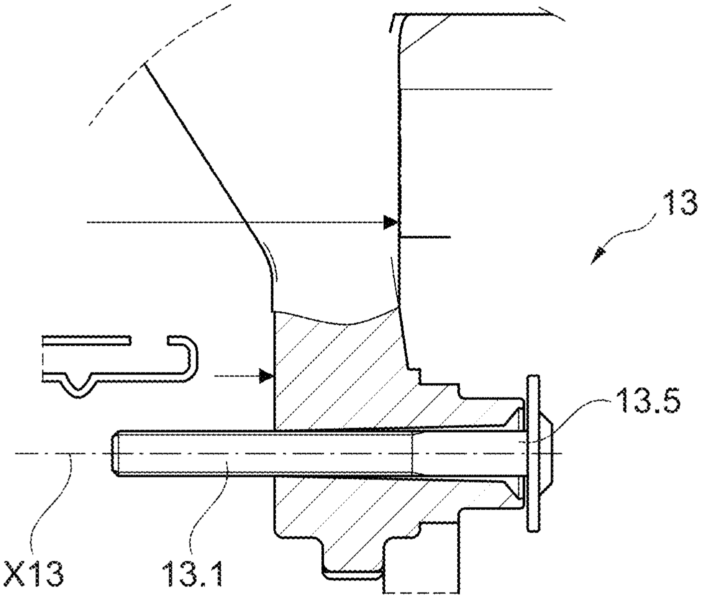
FIG. 4 is a further detailed view of the arrangement according to a preferred embodiment of the present disclosure.

FIG. 3 and FIG. 4 show a plan view and a sectional view of the base body of the step roller unit, in which the axis X13 and the screw 13.5 are arranged.

The invention claimed is:

1. An escalator device comprising:

at least one motor-driven escalator, which has a plurality of individual stair step units mounted so as to be movable relative to one another, wherein the stair step units can be displaced together by motor along a displacement path, wherein each stair step unit has at least one step roller, wherein the respective step roller is mounted about a step roller axis and is guided over a rail or similar support structure, wherein the escalator device has a height limiting device which defines a height limiting stop for preventing an upward vertical movement of the respective stair step unit, wherein the height limiting device interacts with the respective step roller axis, wherein the height limiting device is arranged relative to the step roller axes in such a way that the step roller axes when used as intended arrangement of the respective stair unit are guided past the height limiting device without contact and only come into contact with the height limiting device during an upward vertical movement of the step roller axis.

2. The escalator device according to claim 1, wherein the respective step roller axis extends in such a way that the respective step roller axis projects beyond the corresponding step roller with a protruding axis portion, wherein the height limiting device extends at least partially between a stair step of the stair step unit and the step roller axis and thereby defines the height limiting stop in relation to the step roller axis.

3. The escalator device according to claim 2, wherein the respective step roller axis extends inwardly in such a way that the respective step roller axis projects inwardly beyond the corresponding step roller and projects inwardly from the corresponding step roller or further components provided for its mounting, wherein the height limiting device extends at least partially between the stair step of the stair step unit and the step roller axis and thereby defines the height limiting stop.

4. The escalator device according to claim 1, wherein the height limiting device has a section which encompasses a free end of the respective step roller axis, a section which is L-shaped in cross section and encompasses the respective step roller axis with the encompassing section in a contactless arrangement relative to the respective step roller axis.

5. The escalator device according to claim 1, wherein the height limiting device extends continuously along the displacement path at least in a region in advance of the displacement path, such that the height limiting device provides a guide rail section at least along the advance of the displacement path, the guide rail section having an L-shaped cross section in an overlapping arrangement above the respective step roller axis.

6. The escalator device according to claim 5, wherein the height limiting device is connected point-like or at least partially also flatly to the rail for the step rollers.

7. The escalator device according to claim 1, wherein the height limiting device is arranged relative to the step roller axes such that the step roller axes come into abutment with the height limiting device starting from a predefinable threshold value of 2 mm or 3 mm or 4 mm of the upward vertical movement.

8. The escalator device according to claim 1, wherein the respective step roller axis is provided by a screw fixing the corresponding step roller.

9. The escalator device according to claim 1, wherein the respective stair step unit has at least one first step roller and at least one second step roller, positioned laterally on each side of the respective stair step unit, wherein the first step roller is arranged in a front region of the stair step unit, wherein the second step roller is arranged in a rear region of the stair step unit, wherein the height limiting device is arranged such that the height limiting stop is provided for an upward vertical movement of at least the step roller axis of the second step roller.

10. A use of a height limiting device in the escalator device for limiting the vertical movement of the respective stair step unit of the escalator device, according to claim 1, wherein the height limiting device defines the height limiting stop for preventing the upward vertical movement of at least one step roller of the respective stair step unit to limit any vertical movement of the corresponding step roller to a maximum range between 1 mm to 4 mm, in that an encompassing section is provided by the height limiting device, which encompasses a free end of the step roller axis of the respective step roller at an encompassing section with an L-shaped cross section.

* * * * *